United States Patent
Pirzanski

(10) Patent No.: US 10,325,404 B1
(45) Date of Patent: Jun. 18, 2019

(54) 3D VIRTUAL AUTOMATED MODELING OF CUSTOM CONCHA MODULE

(71) Applicant: Chester Zbigniew Pirzanski, Brampton (CA)

(72) Inventor: Chester Zbigniew Pirzanski, Brampton (CA)

(*) Notice: Subject to any disclaimer, the term of this patent is extended or adjusted under 35 U.S.C. 154(b) by 0 days.

(21) Appl. No.: 16/217,246

(22) Filed: Dec. 12, 2018

Related U.S. Application Data

(60) Provisional application No. 62/767,562, filed on Nov. 15, 2018.

(51) Int. Cl.
  *G06T 17/10* (2006.01)
  *G06F 17/50* (2006.01)
  *G06T 5/00* (2006.01)

(52) U.S. Cl.
  CPC .......... *G06T 17/10* (2013.01); *G06F 17/5009* (2013.01); *G06T 5/002* (2013.01); *G06T 2210/21* (2013.01); *G06T 2215/16* (2013.01)

(58) Field of Classification Search
  CPC .... H04R 25/65; H04R 25/652; H04R 25/658; G06T 17/00
  See application file for complete search history.

(56) References Cited

U.S. PATENT DOCUMENTS

| | | | |
|---|---|---|---|
| 7,084,870 B2 | 8/2006 | Fang | |
| 7,286,679 B2 | 10/2007 | Fang | |
| 7,308,328 B2 | 12/2007 | Fang | |
| 7,447,556 B2 | 11/2008 | McBagonluri | |
| 7,605,812 B2* | 10/2009 | McBagonluri | G06F 17/5009 345/420 |
| 7,609,259 B2 | 10/2009 | McBagonluri | |
| 7,680,634 B2* | 3/2010 | Boltyenkov | H04R 25/652 29/896.21 |
| 7,801,708 B2 | 9/2010 | Unal | |
| 7,991,594 B2 | 8/2011 | Unal | |
| 8,032,337 B2 | 10/2011 | Deichmann | |
| 8,064,731 B2 | 11/2011 | Zouhar | |
| 8,190,280 B2* | 5/2012 | Bindner | G05B 19/4097 700/98 |
| 8,224,094 B2* | 7/2012 | Melkisetoglu | G06K 9/00362 345/420 |
| 8,229,180 B2* | 7/2012 | Baloch | G06K 9/00201 345/420 |

(Continued)

FOREIGN PATENT DOCUMENTS

CA 2408449 C 2/2009
WO WO-117407 A2 11/2006

*Primary Examiner* — Joshua T Kennedy

(57) ABSTRACT

A virtual 3D modeling of a custom shell module for a hearing aid from a digital impression. In this process, a pre-modelled faceplate module is selected from a computer database. The style and size of the selected pre-modelled faceplate module is proper for the shell style and options requested. Through motion and rotation, the selected pre-modelled faceplate module is fitted collision-free in the digital impression and its fit is customized with a buffer. The resulting customized faceplate module is integrated with the canal aperture of the digital impression and becomes the virtual custom concha module. This method is suitable for modeling shell styles such as Half-Shell, Canal, Completely-In-Canal, Invisible-In-Canal.

1 Claim, 6 Drawing Sheets

(56) References Cited

U.S. PATENT DOCUMENTS

| | | | | |
|---|---|---|---|---|
| 8,285,408 | B2* | 10/2012 | Schiller | G06F 17/50 |
| | | | | 700/98 |
| 8,897,458 | B2* | 11/2014 | Parkins | A61F 11/08 |
| | | | | 381/72 |
| 10,158,954 | B1 | 12/2018 | Pirzanski | |
| 2007/0201713 | A1* | 8/2007 | Fang | G06K 9/00214 |
| | | | | 381/322 |
| 2011/0289764 | A1* | 12/2011 | Parsi | H04R 25/60 |
| | | | | 29/594 |
| 2012/0068379 | A1 | 3/2012 | Klemenz | |
| 2015/0073262 | A1 | 3/2015 | Roth | |

\* cited by examiner

Posterior- Anterior View

Lateral View

3D VIRTUAL AUTOMATED MODELING OF CUSTOM CONCHA MODULE

RELATED US APPLICATION DATA

This application claims the benefit of provisional patent application No. 62/767,562, entitled 3D virtual automated modeling of custom concha module, filed on Nov. 15, 2018 by the inventor.

BACKGROUND OF THE INVENTION

This invention relates to a process for the production of custom-moulded ear inserts that are required for ear-level hearing aids and earmolds.

The shape of a custom mould is derived from an ear impression taken individually from the subject's ear. The ear impression is a negative replica of the ear.

There are currently two methods of impression shaping into custom moulds.

The older method is manual impression shaping. In this process, the impression is shaped manually by a technician with the use of mechanical cutters and grinders. The technician removes outer layers from the impression to achieve a mould shape suitable for a given custom product.

The newer method is computer-aided shaping of a digital ear image that is obtained by scanning of silicone impression, direct in-ear scanning, CT scanning, MRI scanning, or any volumetric imaging technique, and is further called a digital impression. In this process, the digital impression is virtually shaped with cutting and grinding tools available in the software.

Both the manual shaping and computer-aided modeling methods are time consuming, subjective, intuitive, and not free from inaccuracies. Inaccuracies in impression shaping result in ear moulds that have inadequate fit and are subsequently returned to the manufacturer with either a request for a new earpiece, or a request for a refund.

There are inventions that disclose automated processes where a pre-modelled shell stored in computer database is matched with a custom ear impression. This approach requires a large number of pre-modelled shells to cover the almost unlimited number of human ear shapes and sizes, and the great variety of custom hearing aid styles and options, which renders this concept impractical. In addition, a shell selected from a computer database is not a custom product.

U.S. patent Ser. No. 10/158,954 by Pirzanski discloses a virtual method for modeling the canal module from a digital impression with the use of 2D templates that feature a predetermined shape. In this method, two or more templates are inserted into the digital impression. Through motion, rotation and stretching the templates are matched with the contour of the ear canal. When positive matches are found, the templates are assembled into a 3D virtual frame, which is surfaced, and becomes the virtual canal module. The limitation of this method is that 2D templates are insufficient for modelling the concha area that features a sophisticated spatial form.

This disclosure describes an innovative method for concha virtual modeling that employs 3D customized modules.

This innovation provides the means of manufacturing custom product that is globally uniformed in physical fit and cosmetic appearance.

BRIEF SUMMARY OF THE INVENTION

The foregoing advantages and features are presented to assist in understanding the invention. They are not intended to be considered limitations on the invention, and should therefore not be considered dispositive in determining equivalents.

The purpose of the invention is to automate the process of virtual modeling custom hearing aid shells and earmolds, shorten modeling time, eliminate subjective and intuitive decisions made by the software operator, and improve the quality of the custom product.

According to this invention, to create a virtual custom hearing aid shell or earmold, two or three virtual custom modules are required, all derived from the same digital impression obtained from the individual ear.

The modules are:
The canal module 600
The concha module 500
The posterior concha module 400

The canal module 600 modelling is disclosed in U.S. patent Ser. No. 10/158,954 by Pirzanski.

The concha module 500 modelling is disclosed below.

The posterior concha module 400 modelling is disclosed in U.S. patent application Ser. No. 16/217,295.

The canal module 600 and the concha module 500 are required for Half-Shell, Canal, Completely-In-Canal and Invisible-In-Canal style hearing aids, and custom Half-Shell and Canal style earmolds.

The canal module 600, the concha module 500, and the posterior concha module 400 are required for Full-Shell hearing aids and Full-Shell, Shell, Skeleton, and Semi-skeleton earmolds, and options such as Canal-lock and Helix-lock.

At the end of the modeling process, the required modules are integrated into the virtual custom hearing aid shell 700, or earmold. The hearing aid shell is hollow, the earmold is solid.

DETAILED DESCRIPTION OF THE INVENTION

This disclosure details modeling of the concha module from a digital impression.

Figure 1A:
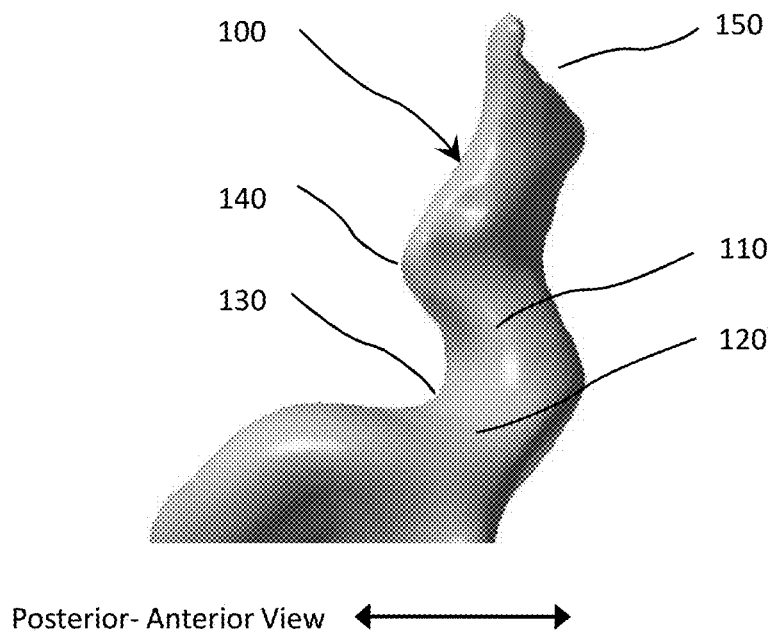
FIGS. 1A-1B show details of the human ear.
Figure 1B:
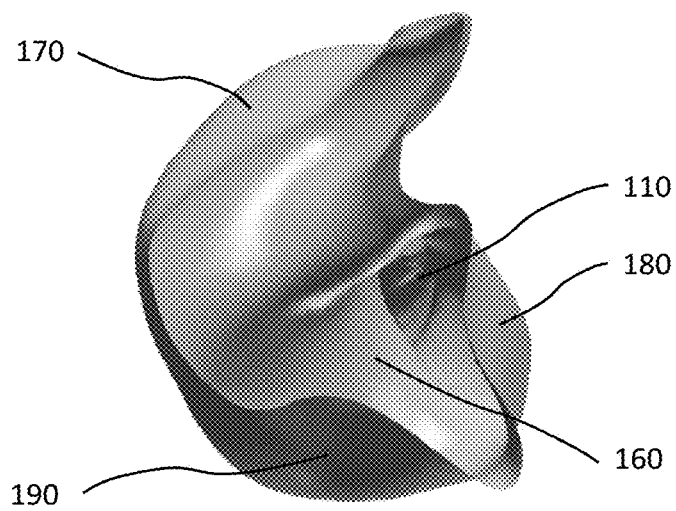

FIG. 1 illustrates anatomical features of the human ear captured in the digital impression 100.

The canal 110 is a long protrusion that extends from the canal aperture 120 towards the eardrum 150.
The canal aperture 120 is the entrance to the ear canal.
The ear canal 110 has two bends. The first canal bend 130 is located past the canal aperture 120, the second canal bend 140 is located closer to the eardrum 150.
Externally, the ear includes the concha 160 and helix 170.
The concha features the tragus 180 and anti-tragus 190.

To be sufficient for this modelling method, the digital impression 100 must be free from major abnormalities, voids, and surgical alterations.

The custom concha module 500 consists of three integral virtual parts: the faceplate module 220, the buffer 230, and the transition module 350.

Computer software aligns and integrates the three parts into the custom concha module 500.

Figure 2:
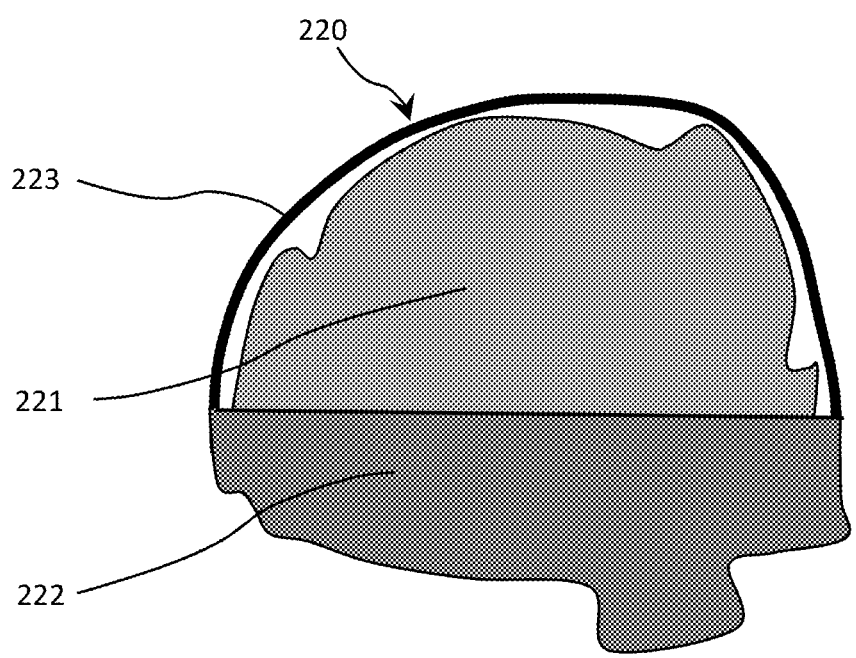
FIG. 2 shows the faceplate module and its components.

The faceplate module 220, shown in FIG. 2, is a 3D object that encompasses hearing aid components 221 mounted on the faceplate 222. The components are covered with a dome 223. The components include, but are not limited to: the battery, battery door, volume control, microphone module, amplifier, telephone coil, magnetic switch, and antenna for wireless communication.

Each hearing aid style and options require at least one pre-modelled faceplate module 220. The actual number of the pre-modelled faceplate modules 220 depends on optional positions of movable components and varying ear concha shapes.

For earmolds, the faceplate module 220 is solid and does not include electronics.

Figure 3:
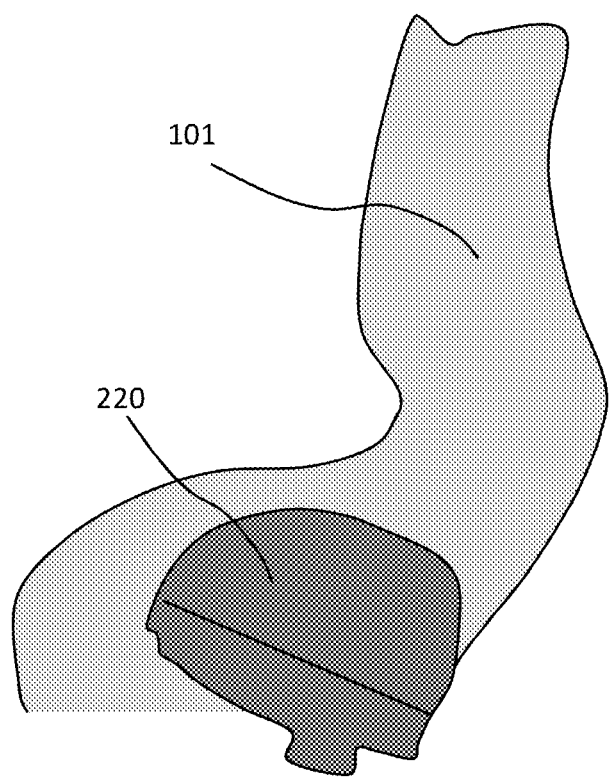
FIG. 3 shows the faceplate module inside the digital impression.

The faceplate module 220 having the highest fit rate for the requested hearing style and options is selected from a computer database and inserted into the digital impression 101, as shown in FIG. 3.

Through motion and rotation, the selected faceplate module 220 is placed in the digital impression 101 with a collision-free fit.

The position and orientation of the selected faceplate module 220 in the digital impression 101 are to meet specific fitting rules previously stored and associated with the hearing aid shell style and options requested. This includes, but is not limited to:

The battery door orientation,

The faceplate module alignment in the concha,

The microphone module alignment with the horizontal plane.

If a collision-free fit of the selected faceplate module 220 in the digital impression 101 cannot be achieved, and/or the specific fitting rules are not met, another pre-modelled faceplate module having the second highest fit rate is selected and fitted. This process of the faceplate module 220 selecting, fitting and changing continues until a faceplate module 220 with a satisfactory fit is found.

Figure 4A:
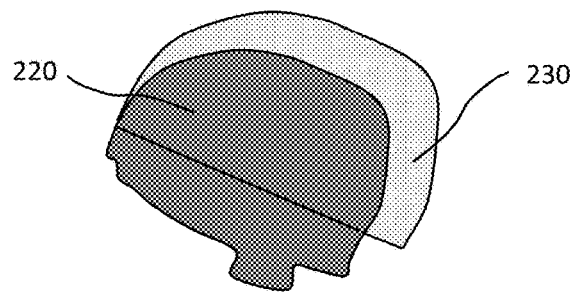
FIGS. 4A-4C show the faceplate module with the buffer.

The fit of the selected faceplate module 220 in the digital impression 101 is customized with the buffer 230, as shown FIG. 4A.

Figure 4B:
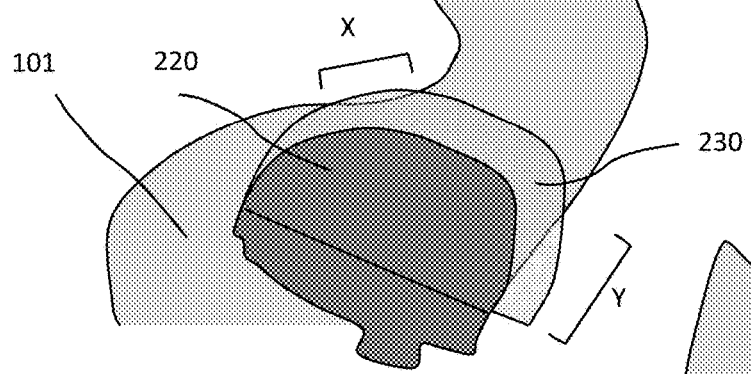
Figure 4C:
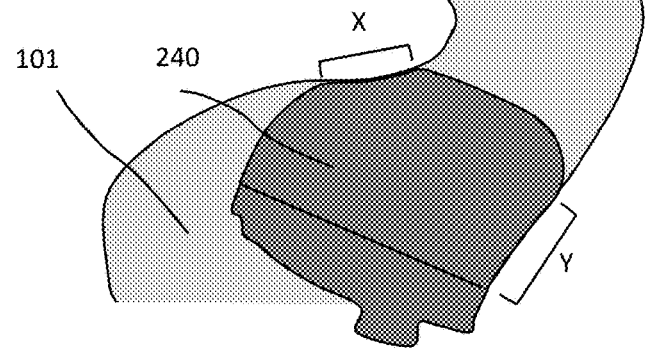

The buffer 230 does not trigger collisions with the digital impression 101. In areas, for example X and Y, where the buffer crosses the contour line of the digital impression 101, the buffer is modified to accommodate the shape of the ear, as illustrated in FIGS. 4B and 4C.

The selected faceplate module 220 and the modified buffer 230 are merged into the customized faceplate module 240.

Figure 5:
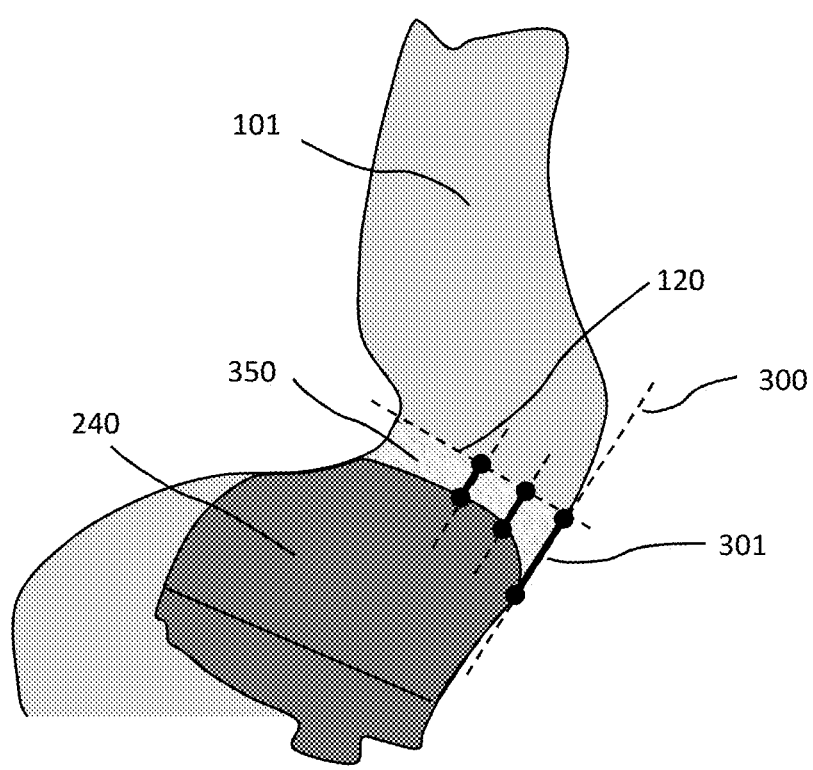
FIG. 5 shows the transition module.

The digital impression 101 is cross sectioned through the canal aperture 120, see FIG. 5, to create a surface area required for the frame of the transition module.

Tangent lines 300 link the customized faceplate module 240 with the cross sectioned canal aperture 120, see FIG. 5.

The number of the tangent lines 300 depends on the modeling accuracy. A 2 mm distance between the lines on the surface of the customized faceplate module 240 is satisfactory. This constitutes the employment of approximately twenty tangent lines 300.

Sections 301 of the tangent lines 300 that extend from the customized faceplate module 240 to the cross-sectioned canal aperture 120 create the frame for the transition module 350, see FIG. 5.

The frame of the transition module 350 is surfaced with oval rings. The height of an oval ring is 0.1 mm to 0.3 mm. Thinner oval rings are required for higher modeling resolution, and thicker for lower resolution.

Figure 6A:
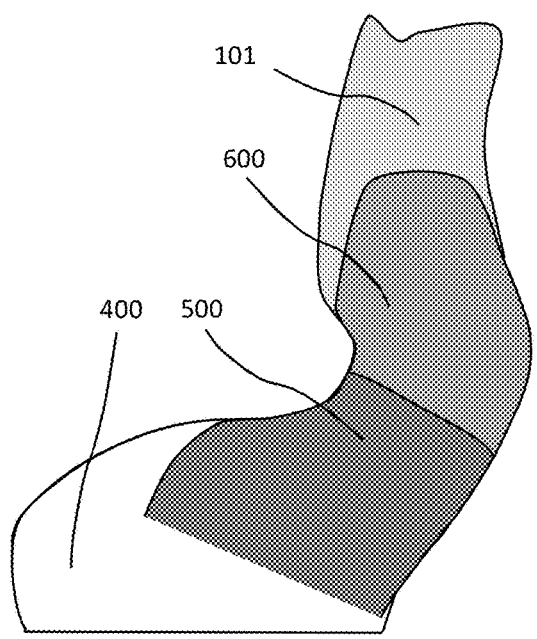
FIGS. 6A-6B show the concha module and the canal module integrated into a hearing aid shell.

The surfaced transition module 350 is merged with the customized faceplate module 240 and the two become the 3D virtual custom concha module 500, as provided in FIG. 6A.

In instances where the concha module 500 is modelled from a digital impression having a wide and/or shallow canal aperture, the buffer 230 may extend to the cross sectioned canal aperture 120 and eliminate the need for the transition module 350. Further, the need for the transition module 350 can be eliminated by merging the contour line of the customized faceplate module 240 with the contour line of the digital impression 101 as disclosed in U.S. patent Ser. No. 10/158,954 by Pirzanski.

The canal module 600, previously modelled from the same digital impression 101 as the concha module 500 is selected from a computer database and placed in the digital impression 101.

Figure 6B:
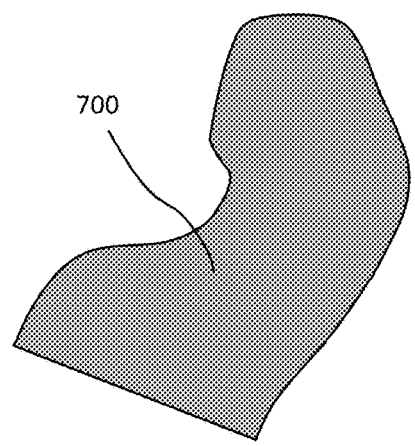

The concha module 500 and the canal module 600 are integrated into a hearing aid shell 700 or earmold, as shown in FIGS. 6A-6B. Note: The modelling and integration of the posterior concha module 400 with the concha module 500 and the canal module 600 is disclosed in U.S. patent application Ser. No. 16/217,295.

Smoothing the integration area is administered to define round contours.

A software operator fine-tunes the component locations and the shape of the hearing aid shell 700 or earmold, if required.

Glossary of Terms

1. Anterior refers to a structure being more in front than another structure in the body.
2. Aperture is the entrance to the ear canal.
3. Bend is something that curves
4. Buffer is a device used as a shield or cushion.
5. Concha is the hollow region in front of the ear canal.
6. Contact area is the surface area where two objects touch and are in contact with each other.
7. Contour line is a line joining points of equal elevation on a surface.
8. Dome is a shape like one-half of a ball.
9. Ear canal is a tube running from the outer ear to the middle ear.
10. Earmold is a device worn inserted into the ear for sound conduction or ear protection.
11. Fit means to be of the right shape.
12. Fit rate indicates the benefit of a given custom product.
13. Hearing aid is an amplification device worn in or on the ear.
14. Helix is the prominent rim of the external ear.
15. Hollow is having a cavity inside.
16. Lateral refers to a structure being further away from the median plane than another structure in the body.
17. Mould is a device shaped to fit an ear.
18. Posterior refers to a structure being more in back than another structure in the body.
19. Shape is the outline of an area or figure.
20. Solid is having the interior filled up.
21. Surface is any face of a body or thing.

LIST OF REFERENCE NUMERALS

100, 101 Digital ear impression
110 Ear canal

120 Canal aperture
130 First canal bend
140 Second canal bend
150 Eardrum
160 Concha
170 Helix
180 Tragus
190 Anti-tragus
220 Faceplate module
221 Components
222 Faceplate
223 Dome
230 Buffer
240 Customized faceplate module
300 Tangent line
301 Tangent line section
350 Transition module
400 Posterior concha module
500 Concha module
600 Canal module
700 Virtual custom hearing aid shell or earmold

What is claimed is:

1. A method of virtually shaping a custom concha module from a digital impression, comprising the steps of:
   a. opening, with one or more computing devices, a file with the digital impression of the ear obtained by a volumetric imaging technique;
   b. selecting from a computer database, executable by one or more processors, a faceplate module having a pre-determined 3D shape;
   c. placing, executable by one or more processors, the selected faceplate module in the digital impression;
   d. adjusting, executable by one or more processors, motion and rotation of the selected faceplate module to obtain a collision-free fit in the digital impression, if a collision-free fit is found, implementing specific fitting rules previously stored and associated with the hearing aid style and options;
   e. measuring, executable by one or more processors, if a fit of the selected faceplate module in the digital impression meets the specific fitting rules, if the specific fitting rules are not met, or the fit is not collision-free, another faceplate module is selected from a computer database and fitted as set forth in steps c to e;
   f. repeating steps b to e until the fit of the selected faceplate module meets the specific fitting rules and is collision-free;
   g. adding, executable by one or more processors, a buffer to the selected faceplate module;
   h. modifying, executable by one or more processors, a shape of the buffer to customize a contact area between the buffer and the digital impression;
   i. merging, executable by one or more processors, the selected faceplate module with the modified buffer into a customized faceplate module;
   j. cross sectioning, executable by one or more processors, the digital impression at a canal aperture;
   k. assembling, executable by one or more processors, a frame for a transition module by linking a surface of the customized faceplate module with the cross-sectioned canal aperture;
   l. surfacing, executable by one or more processors, the frame of the transition module;
   m. integrating, executable by one or more processors, the customized faceplate module with the surfaced transition module into a 3D virtual custom concha module and smoothing edges to define round contours;
wherein steps a to m are automatically executed by one or more computing devices.

* * * * *